C. E. BLYTH.
TRANSFERENCE OF LOOSE MATERIAL.
APPLICATION FILED MAY 9, 1917.
1,323,243.
Patented Dec. 2, 1919.
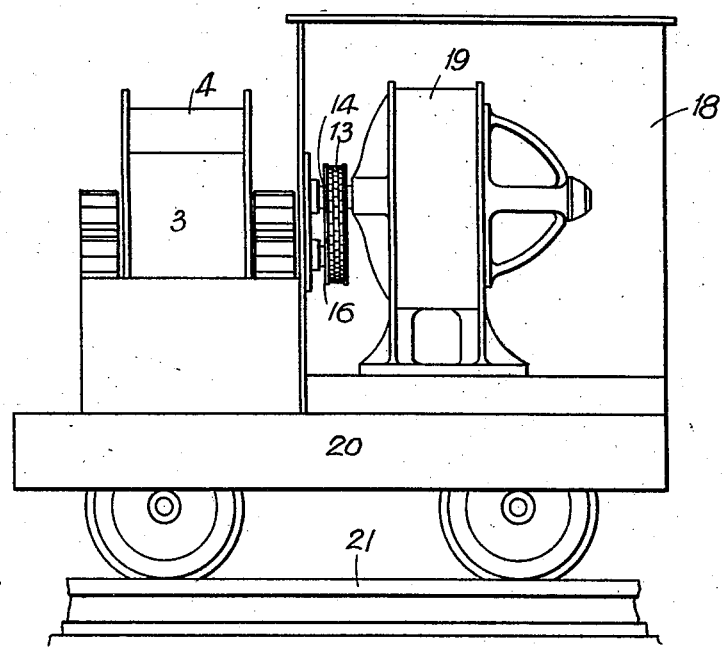
Fig:1.
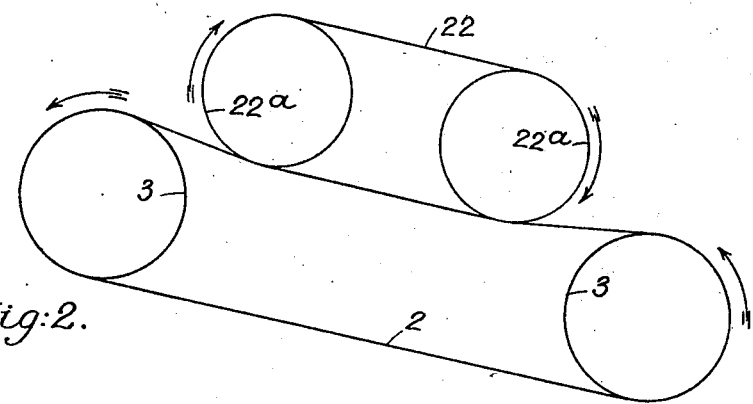
Fig:2.
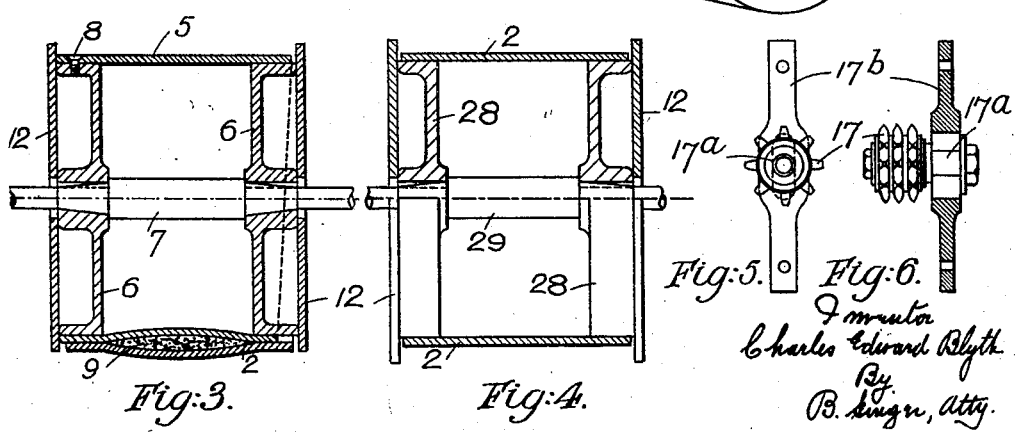
Fig:3.  Fig:4.  Fig:5.  Fig:6.
Inventor
Charles Edward Blyth
By
B. Singer, atty.

UNITED STATES PATENT OFFICE.

CHARLES EDWARD BLYTH, OF STOCKTON, ENGLAND.

TRANSFERENCE OF LOOSE MATERIAL.

1,323,243.   Specification of Letters Patent.   Patented Dec. 2, 1919.

Application filed May 9, 1917. Serial No. 167,590.

*To all whom it may concern:*

Be it known that I, CHARLES EDWARD BLYTH, subject of Great Britain, residing at Stockton, in the county of Warwick, England, have invented certain new and useful Improvements in the Transference of Loose Material, of which the following is a specification.

This invention has reference to a new or improved method of and means for the transference of loose material in and by which the material to be moved is given a certain velocity and direction sufficient to traject or throw it in a continuous stream the desired distance against the force of gravitation.

Broadly stated, the invention consists in feeding the material between high speed surfaces arranged in yielding contact and having velocities of the same magnitude and direction.

For example, the said surfaces may comprise an endless belt and a drum or pulley rotating in contact therewith, the peripheral speed of the pulley being equal in magnitude and direction to that of the belt.

It is found that when loose material such as the debris of quarries, broken coal, grain and similar granular materials of a uniform or varying coarseness, is fed continually between two such high speed surfaces it is thrown or trajected thereby in a continuous stream to a considerable distance which depends in any given instance upon the speed of the surfaces, the angle of delivery and the nature of the material. For example it was found experimentally that with a surface speed of 2,000 feet per minute and a delivery angle of 30° to the horizontal the debris of a quarry could be thrown clear in a continuous stream a distance of approximately 33 feet, while if the surface speed was increased to 3,000 feet per minute, the other conditions remaining the same, a distance of 80 feet or thereabouts was reached. Further experiments with the improved machine hereinafter described have amply proved that the above figures are not indicative of the capacity of the machine, very much improved data having been recorded.

The pulley is preferably flanged and bears upon the upper run of the belt the said flanges forming therewith suitable feeding and delivery chutes.

In order that the angle of delivery may be varied at will to comply with any given conditions provision may be made for adjustment for the belt centers and of the position of the pulley relatively to the belt surface. Preferably, the two surfaces are formed by two belts the lower run of one being superimposed upon the upper run of the other.

In either case one of the belts may conveniently be the driving belt from the motor or other source of power.

Where the said surfaces as aforesaid comprise an endless belt and a drum or pulley rotating in contact therewith it is found that if the face of the drum or pulley is rigid the angle of delivery will vary with the coarseness of the material it is desired to transfer, *i. e.* other factors remaining the same, the coarser the material the greater the angle of delivery. This effect is undoubtedly due to the fact that the face of the drum or pulley being rigid the effective diameter of the same is increased in proportion to the coarseness of the material dealt with, the result being that the belt is depressed to a greater or less extent between its centers so that the angle of the delivery chute formed between the same and the drum or pulley varies accordingly. At the same time it will be obvious that such increased depression of the belt places a heavy stress on the shaft of the drum or pulley and also on the shafts of the driving pulleys around which the belt passes, said stress varying with the coarseness of the material passing through the machine.

A further object of the invention comprehends therefore certain improvements whereby, *inter alia*, the angle of delivery remains constant or approximately so for various materials of different grades or coarseness while at the same time the shafts and bearings of the machine are relieved of undue stresses which as aforesaid would otherwise be created.

In order that the invention may be clearly understood and readily carried into practical effect reference is made in describing the same to the accompanying drawings, wherein, Figure 1 represents a side view of one practical embodiment of the invention.

Fig. 2 is a diagram illustrating the principle of the invention.

Fig. 3 is a sectional view through the drum and belt.

Fig. 4 is a semi-sectional view of one of the driving pulleys.

Figs. 5 and 6 are detail views in front and side elevation respectively of the adjustable sprocket wheel.

Throughout the drawings like parts are designated by similar reference characters.

Referring to the construction shown in Figs. 1, 2, and 3, an endless belt 2 passes around two pulleys 3, 3 one of which is driven at a certain speed. Upon and in contact with the upper run of the belt is arranged the lower run of an upper belt 22, which engages pulleys 22ᵃ and which may either be free to be driven by the belt 2, or positively driven at the same speed by suitable gearing. The direction of rotation of the drums and pulleys is represented by the arrows in Fig. 2 and is such that the lower run of the upper belt and the upper run of the lower belt move in the same direction and at the same speed. The material to be trajected is fed onto the upper run of the belt at the rear of the drum and is positively held without slip in contact with the belt by means of the drum and thereby acquires the same speed as the belt with the result that on emerging from between the belt and drum at the front of the latter it is thrown or trajected thereby at an initial speed equal to that of the surface speed of the belt and drum.

The pulleys or drums over which the belts run are so arranged that the belts may present each a yielding face or periphery so that notwithstanding any variation in the grade or coarseness of the material the effective diameter of the drum or pulley remains constant.

To a limited extent this may be attained by forming the face of the drum or pulley with an annular opening or series of openings and covering the same with an endless sleeve 5 of some suitable flexible material such as belting.

For example, in the arrangement shown in Fig. 3 the drum may be built up of a pair of pulleys 6, 6 keyed at a suitable distance apart upon the shaft 7 and bridged by the sleeve 5. This sleeve is preferably firmly secured at 8 to one side of the drum the other side being left free. Where a pulley or drum constructed in this way is employed the active surface will readily yield as represented in Fig. 3 to the material 9 to a certain extent so that for materials of a certain coarseness or grade the effective diameter of the drum or pulley remains constant and consequently also the angle of delivery.

For the purpose of further reducing or minimizing shocks to and undue stresses on the various bearings and shafts of the machine arising from variations in the coarseness of the material passing through the same it is proposed according to this invention to also provide the faces of the driving pulleys 3, 3 around which the belt passes with an annular opening or series of openings which is or are bridged by the belt so that the center or active portion of the latter being unsupported by the driving pulleys is free to yield to a limited extent.

For this purpose each of the said driving pulleys may, as represented in Fig. 4, be build up of a pair of narrow pulleys, 28, 28, keyed at the required distance apart from the shaft 29 and adapted to be bridged by the belt 2.

In view of the high speeds at which the machine is run it is proposed to inclose the pulleys at each side by disks 12 to avoid windage said disks projecting beyond the peripheries of the pulleys, so as to constitute shrouding therefor at each side.

The drive, Fig. 1, is preferably distributed positively and equally to the shafts by means of an endless chain 13 which meshes with sprocket wheels 14, 16, on the shafts of the motor, and the two driving pulleys respectively in such a manner as to drive all of these shafts at the same speed.

A jockey or loosely mounted sprocket wheel 17 may as shown be employed to support the upper run of the chain and to provide for adjustment of the latter. According to the arrangement shown in Figs. 5 and 6, adjustment of the sprocket wheel 17 is obtained by mounting the spindle 17ᵃ thereof in a fixed product plate 17ᵇ.

The complete machine with a cabin 18 for the electric motor 19 or other source of power may be mounted on a bogie or truck 20 so as to run on rails 21.

As already stated the high speed surfaces may be constituted by the upper and lower runs of two superimposed parallel belts as represented by the diagram Fig. 2, the two belts having the same speed and the two contacting runs traveling in the same direction as indicated by the arrows. The material is fed onto the rear part of the upper run of the lower belt 2 and in passing through the machine is positively held in contact therewith by the lower run of the upper belt 22. The two belts as aforesaid having the same speed it will be obvious that there can be no slip between the material and the belt and consequently no wasted energy so that the material is trajected from the front of the machine with an initial velocity equal to that of the belts.

Having thus described my invention, I claim:

1. Apparatus for the transference of loose material by trajection comprising in combination, a pair of rotatable pulley-like members, a covering for the working faces of such pulleys including an endless sheet of material, such sheet of material being firmly secured to one of the side walls of the pulleys, the other edge of such material resting against the opposite side walls, the peripheral surfaces of such pulleys being arranged in yielding contact, one with respect to the other, and means for rotating said pulleys in opposite directions so that they have equal peripheral speed, and means for feeding the material between them.

2. Apparatus for the transference of loose material by trajection comprising in combination, a pair of rotatable pulleys, such pulleys including side walls and annular shoulders arranged around the inner faces of such side walls, a peripheral covering firmly secured along one of its edges to one of such shoulders and loosely resting upon the opposite shoulder, such pulleys having their peripheral surfaces arranged in yielding contact, means for rotating the same in opposite directions so that they have equal peripheral speed, and means for feeding the material between them.

In witness whereof I have hereunto set my hand and seal this 29th day of March, 1917.

CHARLES EDWARD BLYTH. [L. S.]